P. LESSON.

Sheet-Metal Vessels.

No. 5,770. Reissued Feb. 17, 1874.

Witnesses:
Ernst Bilhuber
Henry Dentner

Inventor:
Philip Lesson
per
Van Santwood & Hauff
Attys

UNITED STATES PATENT OFFICE.

PHILIP LESSON, OF NEWARK, NEW JERSEY.

IMPROVEMENT IN SHEET-METAL VESSELS.

Specification forming part of Letters Patent No. 123,269, dated January 30, 1872; reissue No. 5,776, dated February 17, 1874; application filed January 2, 1874.

*To all whom it may concern:*

Be it known that I, PHILIP LESSON, of Newark, in the county of Essex and State of New Jersey, have invented a new and useful Improvement in Metallic Vessels; and I do hereby declare the following to be a full, clear, and exact description thereof, which will enable those skilled in the art to make and use the same, reference being had to the accompanying drawing forming part of this specification, in which drawing—

Figure 1:
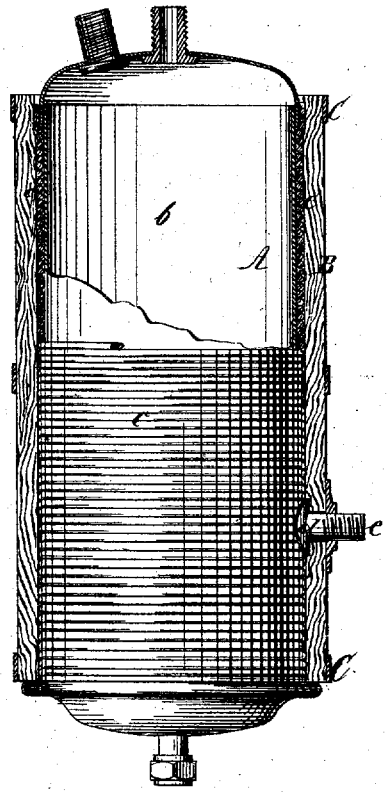
Figure 2:
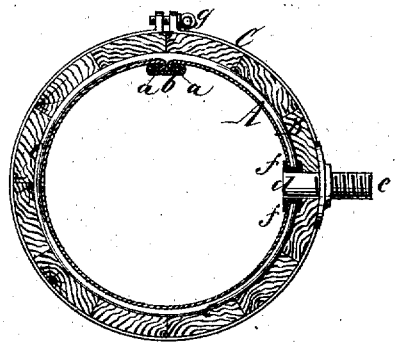

Figure 1 represents a sectional side view of a boiler. Fig. 2 is a horizontal section thereof.

Similar letters indicate corresponding parts.

This invention consists in the arrangement of a jacket made of closely-wound metal wire coated with, and united together and to the body of the vessel by, tin, said jacket being applied to the body of a vessel in such a manner that said body is strengthened uniformly throughout its whole length, thereby enabling the manufacturer to reduce the weight of the sheet metal in the body, also to dispense with the strengthening-hoops and to produce a vessel of superior strength and durability at the usual, or even at a reduced, cost. If the body of the vessel is perforated with a hole, the edge of such hole is protected by a double-flanged bushing or grummet, so as to retain the ends of the wire firmly in position. With the strengthening-jacket surrounding the body of the vessel I have also combined a wooden casing, which serves the double purpose of giving to said vessel a good appearance and of preventing people from burning themselves by coming in direct contact with the metallic body, if the contents thereof are hot. The seam of the body of my vessel is produced by a double-flanged slide, which catches over the outwardly-bent edges of the sheet of metal from which said body is made, and thereby the seam is materially strengthened.

In the drawing, the letter A designates the body of a vessel which is intended to be exposed to pressure, and which is made of sheet metal, sheet-copper being used by preference. The edges *a a* of the sheet, which are to be joined together, are bent outward, as shown in Fig. 2, and a double-flanged slide, *b*, is slipped over them, so as to retain them firmly together. The interior surface of the boiler is coated with tin, and, by applying soft solder to the slide *b* and hook-shaped edges *a a*, a strong and durable seam is produced, and the tedious labor of bracing the edges of the body together can be dispensed with. The body A is strengthened by a jacket, *c*, which is made of metal wire wound closely upon and soldered to said body, as shown in Fig. 1. This metal wire is coated with tin, and after it has been wound on the body the whole is dipped into molten tin, and thereby the coils of the wire are firmly united together and to the body, and a jacket of great strength is produced. By this jacket the body A is rendered strong and durable, which enables the same to withstand successfully the pressure of the atmosphere in case a vacuum should form in the interior of the vessel, and also any reasonable internal pressure or any blows to which said vessel may be exposed.

By applying my jacket to the body of the vessel I am enabled to reduce the weight of sheet metal used in the construction of said vessel, and I can dispense with the strengthening-hoops usually applied to such vessels, so that the cost of my vessel is but little, if any, larger than that of a vessel of the same capacity constructed in the ordinary manner, and at the same time my vessel is much more durable.

A vessel provided with strengthening-hoops is liable to crack at the points close to said hoops, since those portions of the vessel which are situated between the hoops are exposed to frequent compressions and expansions; but in my vessel the entire body is of uniform strength, and no portion thereof will wear out prematurely.

Through the side of the body A is cut a hole, *d*, for the reception of the pipe *e*. The edges of this hole are protected by a double-flanged bushing, *f*, which is similar to a large eyelet. The outer flange of this eyelet catches over the ends of the wires, which are laid bare by cutting the hole, and by said flange the wires are prevented from getting loose.

The outer surface of the jacket *c* may be coated with varnish, so as to impart to it a handsome appearance, but I apply, by preference, a wooden casing, B, which is made of a series of staves, (Fig. 2,) and held in place by hoops C, which are drawn up tight by screws

*g*, or by any other suitable means. This wooden casing has the double advantage of imparting to the vessel a handsome appearance and also of serving as a guard to prevent people from burning themselves by coming in contact with the metallic body of the vessel, if the contents thereof should be heated. By inclosing the vessel in the wooden casing, the tedious labor of polishing the surface of the same and of keeping the same bright is saved, and the same saving in time and labor is effected by applying to the outer surface of the strengthening-jacket one or more coats of varnish. Furthermore, the strengthening-jacket and also the wooden casing protect the vessel A from getting bruised or injured by blows against it.

What I claim as new, and desire to secure by Letters Patent, is—

1. In combination with a metallic vessel, the spiral-wire jacket, permanently connected with the exterior of the vessel by solder for strengthening said vessel, substantially as described.

2. The double-flanged eyelet, in combination with the shell and strengthening-jacket for forming a bushing and protecting the ends of the wires, substantially as described.

PHILIP LESSON.

Witnesses:
W. HAUFF,
CHAS. WAHLERS.